United States Patent
Lee et al.

(10) Patent No.: US 6,769,167 B2
(45) Date of Patent: Aug. 3, 2004

(54) METHOD OF MANUFACTURING A ROTOR FOR A SYNCHRONOUS RELUCTANCE MOTOR

(75) Inventors: Kyung Hun Lee, Seoul (KR); Jae Yoon Oh, Seoul (KR); Dal Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/045,147

(22) Filed: Jan. 15, 2002

(65) Prior Publication Data

US 2003/0020351 A1 Jan. 30, 2003

(30) Foreign Application Priority Data

Jul. 28, 2001 (KR) .............................. 10-2001-0045752
Jul. 28, 2001 (KR) .............................. 10-2001-0045751

(51) Int. Cl.[7] ............................................ H02K 15/00
(52) U.S. Cl. .................... 29/596; 29/524.1; 29/525.06; 29/598; 29/609; 29/736; 310/216; 310/217; 310/166; 310/168
(58) Field of Search .......................... 29/596, 598, 609, 29/736, 524.1, 525.06; 310/216, 217, 166, 168

(56) References Cited

U.S. PATENT DOCUMENTS

| | | | | |
|---|---|---|---|---|
| 3,829,720 A | * | 8/1974 | Swanke et al. ................ 310/43 |
| 4,745,320 A | * | 5/1988 | Oyama et al. ............... 310/217 |
| 4,864,176 A | * | 9/1989 | Miller et al. ................. 310/194 |
| 4,928,375 A | * | 5/1990 | Hadaway ....................... 29/509 |
| 5,142,178 A | * | 8/1992 | Kloster et al. ............... 310/217 |
| 5,258,678 A | * | 11/1993 | Futami ......................... 310/156 |
| 5,534,736 A | * | 7/1996 | Johnson ......................... 310/91 |
| 5,704,111 A | * | 1/1998 | Johnson et al. ................ 29/598 |
| 5,722,144 A | * | 3/1998 | Bora ......................... 29/402.05 |
| 5,801,478 A | * | 9/1998 | Nashiki ....................... 310/261 |
| 5,841,212 A | * | 11/1998 | Mita et al. ................... 310/156 |
| 5,889,346 A | * | 3/1999 | Uchida et al. ............... 310/156 |
| 6,005,318 A | * | 12/1999 | Pop, Sr. ....................... 310/256 |
| 6,006,418 A | * | 12/1999 | Takeda et al. ................ 29/598 |
| 6,034,461 A | * | 3/2000 | Sun ............................ 310/218 |
| 6,047,460 A | * | 4/2000 | Nagate et al. ................ 29/598 |
| 6,064,134 A | * | 5/2000 | El-Antably et al. ......... 310/261 |
| 6,066,904 A | * | 5/2000 | Fei et al. ..................... 310/168 |
| 6,121,706 A | * | 9/2000 | Nashiki et al. ............. 310/168 |
| 6,223,417 B1 | * | 5/2001 | Saban et al. .................. 29/598 |
| 6,259,180 B1 | * | 7/2001 | Pop, Sr. ...................... 310/156 |
| 6,321,439 B1 | * | 11/2001 | Berrong et al. ............... 29/596 |
| 6,396,188 B1 | * | 5/2002 | Kliman et al. .............. 310/217 |
| 6,421,907 B1 | * | 7/2002 | DeHart ........................ 29/596 |

FOREIGN PATENT DOCUMENTS

JP    P2000-102202 A    4/2000

* cited by examiner

Primary Examiner—A. Dexter Tugbang
Assistant Examiner—Paul D Kim
(74) Attorney, Agent, or Firm—Fleshner & Kim, LLP

(57) ABSTRACT

A rotor for a synchronous reluctance motor of flux barrier type and manufacturing method thereof constructs a rotor for a synchronous reluctance motor by forming a magnetic core steel plate of disc shape on which a shaft hole is formed at center part, and a plurality of flux barrier groups are formed centering around the shaft hole and automatic stacking points are formed; manufacturing a plate stacked body by stacking the core steel plates continuously using the automatic stacking points; disposing end plates on both sides of the plate stacked body; and coupling the end plates and the plate stacked body integrally with each other as inserting a coupling member into the flux barrier groups, whereby the manufacturing process can be made easy and automatic stacking of the core steel plates can be made regardless of the types such as a skew type or a non skew type, and therefore manufacturing cost is reduced and the rotor can be mass produced.

32 Claims, 10 Drawing Sheets

METHOD OF MANUFACTURING A ROTOR FOR A SYNCHRONOUS RELUCTANCE MOTOR

BACKGROUND OF THE INVENTION

1. Field of the Invention

The present invention relates to a rotor for a synchronous reluctance motor and a manufacturing method thereof, and particularly, to a rotor for a synchronous reluctance motor of flux barrier type and a manufacturing method.

2. Description of the Background Art

A synchronous reluctance motor is a kind of synchronous motor, and it has relatively low price, and high efficiency and responsiveness, however, it has a complex structure and it is hard to be manufactured, whereby it takes a lot of costs and times. Therefore, it is not mass-produced nowadays.

The synchronous reluctance motor as described above comprises a stator and a rotor formed by insulatingly stacking a plurality of steel plates. Herein, the stator is nearly similar to a general stator in an induction motor, and the rotor includes a rotor core on which a plurality of flux barriers are formed in order to generate difference between a magnetic resistance.

FIG. 1 is a view showing a rotor core in the synchronous reluctance motor of flux barrier type according to the conventional art.

As shown therein, the conventional rotor core is made by a plurality of magnetic core steel plates 111 formed as circular plates, which are stacked along with a rotation shaft line direction so as to be insulated with each other, and a shaft hole 112 is formed at a center part of the respective core steel plates 111 so as to receive a rotational shaft. A plurality of bolt holes 113 are formed on boundary part of the shaft hole 112 so as to receive a fixing bolt (not shown) which couples and fixes the stacked respective core steel plates 111 integrally in the shaft line direction.

On the other hand, a plurality of magnetic pole portions P1~P4 are formed on boundary part of the respective core steel plates 111, and a plurality of flux barrier groups B1~B4 are formed between the respective magnetic pole portions P1~P4 so as to generate a difference between the magnetic resistance.

The respective flux barrier group B1~B4 includes a plurality of flux barriers 115 which are formed as penetrating the plate surface so that both ends are abutting on a circumference and a center part has an arc shape protruded toward the shaft hole 112, and disposed alternatively with magnetic paths 117 in radial direction of the core steel plates 111. A plurality of lugs 119, which are depressed from one plate surface and protruded toward the other plate surface, and therefore inserted into the depressed parts of the another lug 119 when the plates are stacked, are formed on the magnetic paths 117 between the respective flux barriers 115.

However, according to the rotor of the conventional flux barrier type synchronous reluctance motor, many flux barriers 115 and lugs 119 are formed on the core steel plate 111, and therefore, a strength of the motor is weak so that a distortion may be generated, a phenomenon that the core steel plates 111 are separated from each other at their edges may be generated, and it took much time and cost to assemble so that the manufacturing cost is increased.

Especially, the flux barrier type synchronous reluctance motor is now experimentally manufactured, and can not be mass-produced and utilized.

Also, the rotor of the conventional synchronous reluctance motor can not be applied to a skew type rotor in which the flux barrier is disposed to have a predetermined skew for the rotational shaft due to arranging structure of the lugs 119 and shapes of the flux barriers 115.

On the other hand, FIG. 2 is a view showing an another example of the rotor core in the conventional flux barrier type synchronous reluctance motor. As shown therein, a rotor core 120 is made by stacking a plurality of circular plate members 121 including a plurality of holes 122 of arc shapes formed on boundary.

The respective circular plate member 121 is made using one of a magnetic member or non-magnetic member. In case that the circular plate member is made using the magnetic member, the flux barrier is formed by filling a nonmagnetic filling member 123 into the hole 122 of arc shape after stacking the plates. In addition, in case that the circular plate member is made using the nonmagnetic member, a magnetic filling member 123 is filled in the hole 122 after stacking the plates to form a magnetic pole part, whereby the rotation power is generated by the difference of the magnetic resistance.

However, according to the rotor of the conventional flux barrier type synchronous reluctance motor described above, the circular plate members 121 is stacked, after that, the filling member 123 is filled into the holes 122, and a boundary part 124 is removed by machining after the filling is completed. Therefore, an additional filling device for filling the filling member 123 and an additional device for fabricating the boundary part, and also, it takes much time to manufacture the product and the manufacturing cost is increased.

Also, the rotor of the conventional flux barrier type synchronous reluctance motor is difficult to be applied to the rotor of skew type due to the structure of the hole 122 which is formed as an arc.

SUMMARY OF THE INVENTION

Therefore, an object of the present invention is to provide a rotor for a synchronous reluctance motor and a manufacturing method which can be easily manufactured, is able to reduce manufacturing cost, and suitable for mass producing by automatically stacking core steel plates regardless of skew type or non skew type.

To achieve the object of the present invention, as embodied and broadly described herein, there is provided a rotor for a synchronous reluctance motor according to the present invention comprising: a plate stacked body made by stacking a plurality of magnetic core steel plates on which a shaft hole is formed at center part and a plurality of flux barrier groups are formed around the shaft hole; end plates which are disposed on both sides of the plate stacked body; a coupling means penetrating the flux barrier groups and coupling the plate stacked body and the end plates as a single body; and a rotational shaft which is inserted into the plate stacked body and the end plates.

The flux barrier group includes a plurality of flux barriers having both end parts abutting on an outer circumference of the core steel plate and a center part of arc shape hole protruded toward the shaft hole.

The flux barriers are formed so that widths of the holes are gradually increased from the outer circumference to the shaft hole along with the radial direction of the core steel plate, and the widths of the holes are gradually reduced toward both ends. In addition, the respective flux barrier includes a straight line part at their center part.

Four flux barrier groups are formed so as to be symmetric with each other, and the respective flux barrier group includes three flux barriers.

The coupling means passes through a flux barrier which is located in the middle of the three flux barriers.

In addition, the coupling means includes a rivet which passes through at least one flux barrier among those the plurality of flux barriers in the plate stacked body from the end plate on one side and is exposed as passing through the end plate on the other side.

Herein, the coupling means may include a fixing bolt which penetrates at least one flux barrier among those plurality of flux barriers in the plate stacked body from the end plate on one side and is exposed to the end plate on the other side, and a nut which is coupled to the exposed end of the fixing bolt using a screw.

An automatic stacking point which is coupled to the other when the plates are stacked is formed on the core steel plate, and the automatic stacking point is protruded from one surface of the core steel plate to the other surface. The automatic stacking point is protruded as a square shape.

The automatic stacking point may be formed on boundary part of the shaft hole, or may be formed on an outer circumference of the core steel plate between the flux barriers.

On the other hand, a plurality of pin holes are formed on the boundary part of the shaft hole on the core steel plate, and a pin can be inserted into the pin hole to be fixed.

A manufacturing method of the rotor for the synchronous reluctance motor according to the present invention comprises: a step of forming a core steel plate of magnetic disc on which a shaft hole is formed at center, a plurality of flux barrier groups are formed centering around the shaft hole, and automatic stacking points are formed; a step of forming a plate stacked body by continuously stacking the core steel plates using the automatic stacking points; a step of disposing the end plates on both sides of the plate stacked body; and a step of coupling the end plates and the plate stacked body integrally by passing through the flux barriers.

The step of forming the plate stacked body comprises: a step of forming the automatic stacking points between the flux barriers adjacent to the shaft hole; and a step of rotating at least one steel plate between the steel plate which will be stacked after forming of the automatic stacking point and the steel plate which was stacked before as a predetermined angle.

The step of coupling the end plates and the plate stacked body integrally with each other is made by riveting as penetrating one of the plurality of flux barriers on the plate stacked body from the end plate on one side.

Also, there is provided a manufacturing method of the rotor for the synchronous reluctance motor according to the present invention comprising: a step of forming a magnetic core steel plate of disc form, on which a shaft hole is formed at center part and a plurality of pin holes are formed an boundary part of the shaft hole and a plurality of flux barrier groups which are symmetrically formed to each other; a step of manufacturing the plate stacked body by continuously stacking the core steel plates; a step of coupling a pin into the pin holes of the plate stacked body; a step of disposing nonmagnetic end plates of disc shape on both sides of the plate stacked body; and a step of fixing the end plates and the plate stacked body as a single body by penetrating one of the plurality of flux barriers using a coupling member made by nonmagnetic material.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
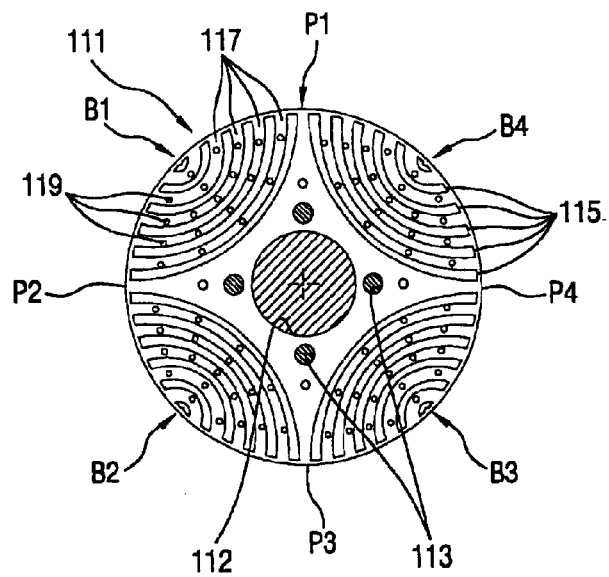
FIG. 1 is a transverse cross-sectional view showing a rotor core in a conventional synchronous reluctance motor.
Figure 2:
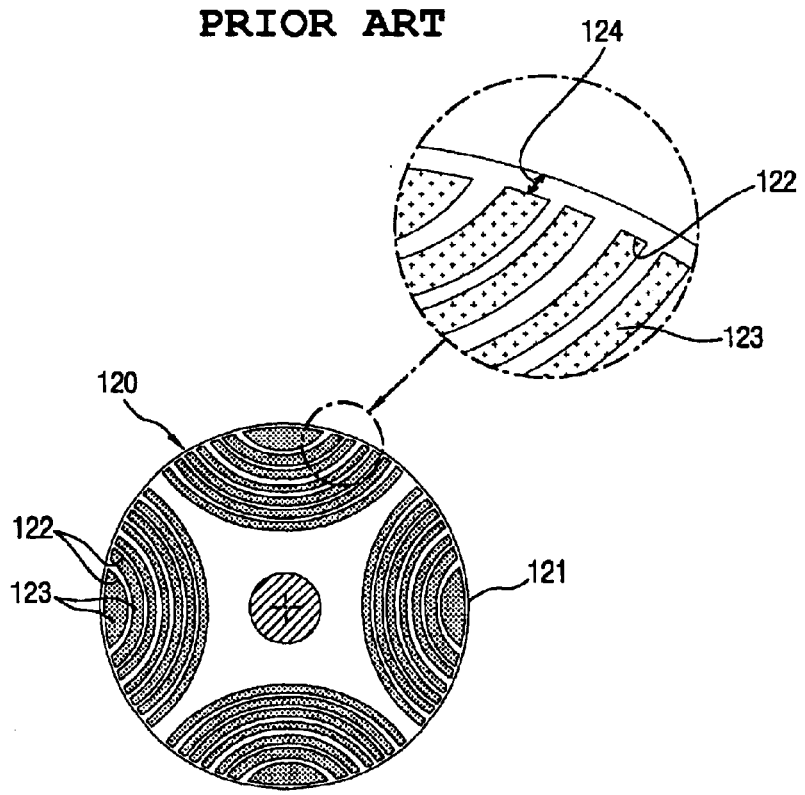
FIG. 2 is a transverse cross-sectional view showing another example of the rotor core in the conventional synchronous reluctance motor.
Figure 3:
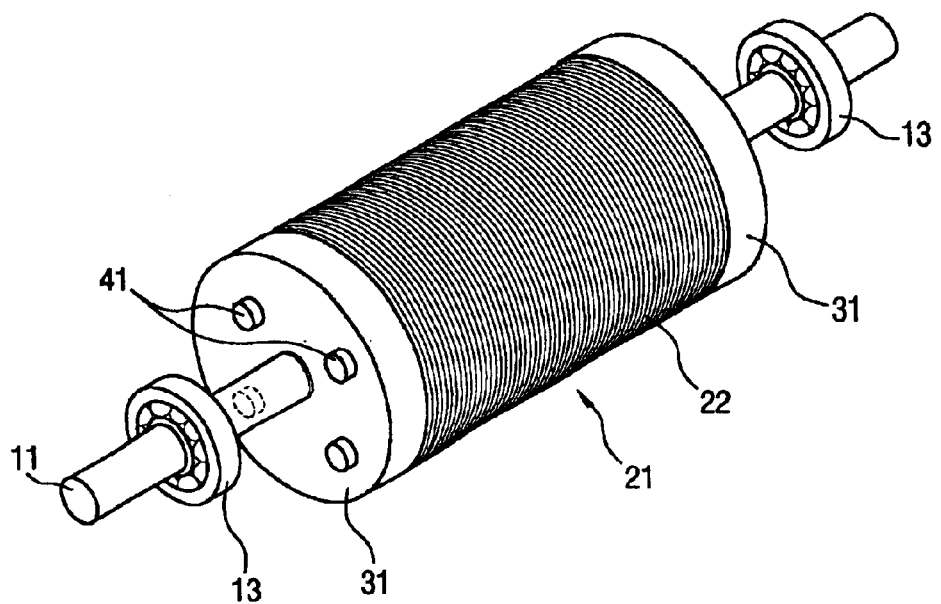
FIG. 3 is a perspective view showing a rotor of a synchronous reluctance motor according to a first embodiment of the present invention.
Figure 4A:
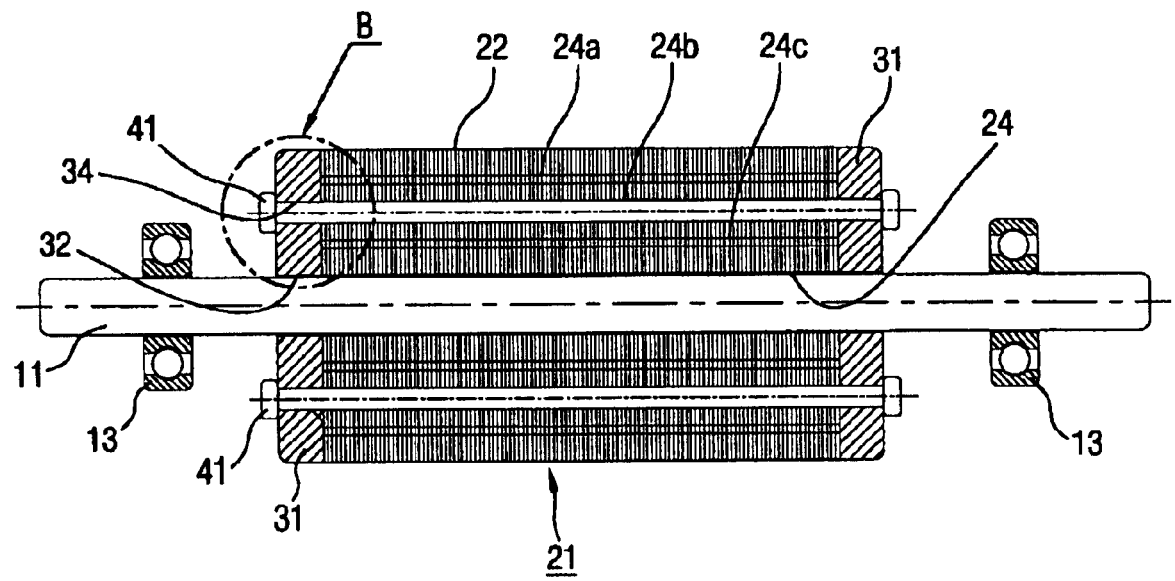
FIGS. 4A and 4B are a longitudinal cross-sectional view and an enlarged view showing the rotor in FIG. 3.
Figure 4B:
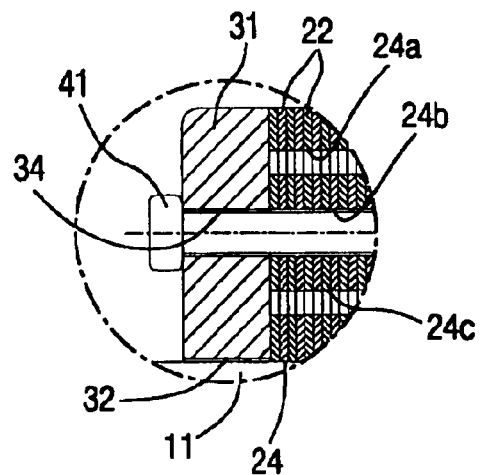
Figure 5A:
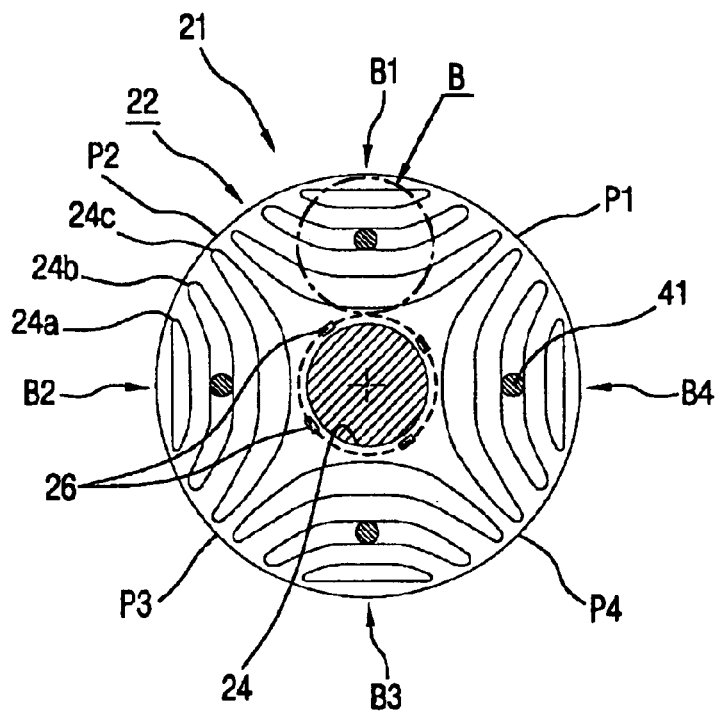
FIGS. 5A and 5B are a transverse cross-sectional view and an enlarged view showing the rotor in FIG. 3.
Figure 5B:
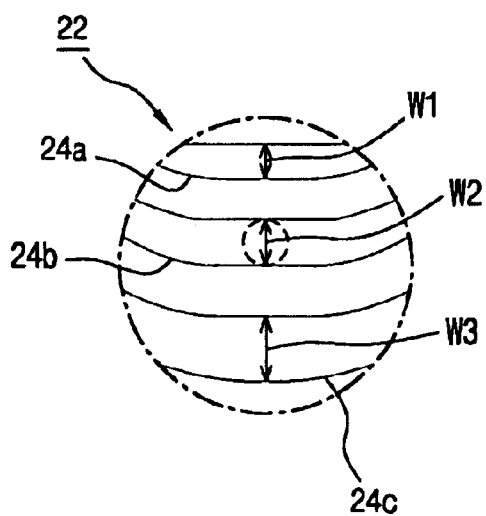

A FIG. 3 is a perspective view showing a rotor for a flux barrier type synchronous reluctance motor according to a first embodiment of the present invention, FIGS. 4A and 4B are a longitudinal cross-sectional view and an enlarged view showing the rotor in FIG. 3, and FIGS. 5A and 5B are a transverse cross-sectional view and an enlarged view showing the rotor in FIG. 3.

As shown therein, the rotor for the synchronous reluctance motor according to the first embodiment of the present invention comprises: a rotational shaft 11; a plate stacked body 21 formed by stacking a plurality of core steel plates 22 of disc shape and coupled integrally to a boundary of the rotational shaft 11; a pair of end plates 31 disposed to be contacted to both sides of the plate stacked body 21 along with the shaft line direction of the rotational shaft 11; and a plurality of rivets 41 penetrating the end plates 31 and the plate stacked body 21 for coupling the end plates 31 and the plate stacked body 21 as a single body.

A pair of bearing members 13 for supporting the rotational shaft 11 so as to be rotatable are coupled to both end parts of the rotational shaft 11, and the end plates 31 and the rivets 41 are made using nonmagnetic materials.

The end plates 31 are formed as disc having corresponding size to a diameter of the core steel plate 22, and a shaft through hole 32 is formed at center part of the end plate 31 so that the rotational shaft 31 can be inserted and coupled. A plurality of through holes 34 are formed around the shaft through hole 32 so as to communicate with respective flux barriers which will be described later after stacking.

As shown in FIGS. 5A and 5B, the plate stacked body 21 includes the plurality of core steel plates 22 which are formed to have disc form using magnetic member and stacked to be insulated with each other, and a plurality of magnetic pole portions P1~P4 are formed in boundary direction on the respective core steel plate 22.

Flux barrier groups B1~B4 are formed between the respective magnetic poles P1~P4, and the respective flux barrier group B1~B4 includes a first, a second, and a third flux barriers 24a~24c which are disposed to be apart each other from a circumferential surface to a center part in radial direction of the respective core steel plate 22.

Herein, the number of the flux barriers may be varied according to a size of the core steel plates 22. In addition, it is desirable that three barriers are formed in case that the diameter of the core steel plate 22 is 50 mm~80 mm, and that four barriers are formed in case that the diameter of the core steel plate 22 is 70 mm~100 mm.

The respective flux barriers 24a~24c are formed as penetrating the plate surface so that both ends of the barriers abut on the circumference of the core steel plate 22 and the center part is curved toward a shaft hole 24. The respective flux barriers 24a~24c are formed so that widths of the barriers are gradually reduced from the center parts to the both ends, and the widths of the barriers are increased as closing to a rotational center in radial direction of the respective core steel plate 22.

That is, a width W2 of the second flux barrier 24b is larger than that W1 of the first flux barrier 24a, and a width W3 of the third flux barrier 24c is larger than that W2 of the second flux barrier 24b.

Herein, the rivet 41 penetrates the respective second flux barrier 24b, and fixes the end plates 31 and the plate stacked body 21 in stacked state.

On the other hand, automatic stacking points 26 are formed between the respective third flux barriers 24c for stacking the plates, and the automatic stacking points 26 having nearly square shapes are formed to be depressed on one plate surface of the core steel plate 22 and protruded to the other plate surface.

Four automatic stacking points 26 described above are symmetrically formed around the shaft hole 24 of the core steel plate 22 so as to be applied to a skew type rotor, as well as to a non skew type rotor.

Figure 6:
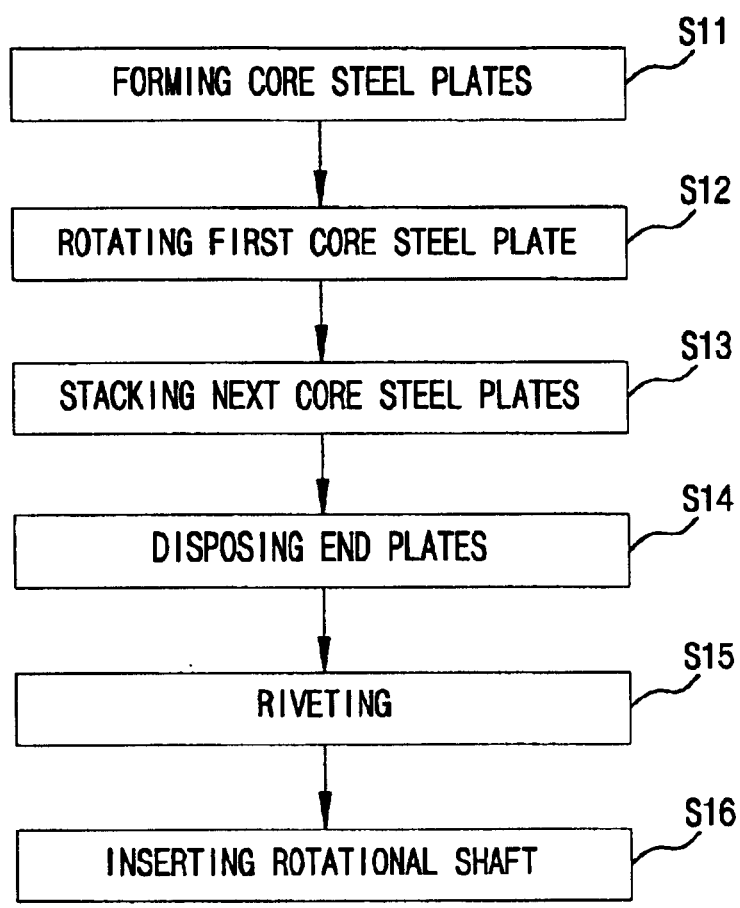
FIG. 6 is a flow chart for describing a manufacturing method of the rotor for the synchronous reluctance motor according to the first embodiment of the present invention.

FIG. 6 is a flow chart for describing the manufacturing method of the rotor for the synchronous reluctance motor according to the first embodiment of the present invention.

As shown therein, the manufacturing method of the rotor for the synchronous reluctance motor according to the first embodiment of the present invention will be described as follows. In case that the rotor is manufactured as a skew type, the core steel plate 22 is formed using a usual method such as press (S11), and the formed first core steel plate 22 is disposed on a rotation supporting board (not shown) which can be rotated as a predetermined angle so as to control the skew. In addition, the first core steel plate 22 is rotated by the rotation supporting board as a predetermined angle, that is, as an angle corresponding to the skew (S12).

After that, a second core steel plate 22 is stacked on the first core steel plate 33 which is rotated to a predetermined angle by the rotation supporting board (S13). At that time, the protruded parts of the automatic stacking points 26 formed on boundary part of the shaft hole 24 are inserted into the depressed parts of the automatic stacking point 26 on the first core steel plate 22, whereby the first and second core steel plates 22 are coupled to restrain each other to rotating direction and movements of the respective core steel plates are prevented.

The plate stacked body 21 is formed by stacking the predetermined numbers of core steel plates 22 as the method described above, and the end plates 31 are disposed on both ends of the plate stacked body 21 (S14).

After that, the rivet 41 is inserted into the through hole 34 of the plate stacked body 21 and the second flux barrier 24b so that the end plates 31 and the plate stacked body 21 are coupled integrally with each other, and then both end parts are riveted (S15). Herein, a nonmagnetic fixing bolt is coupled to the through hole 34 of the end plates 31 and to the second flux barrier 24b, and a nut is coupled to a male screw portion of the fixing bolt, and therefore the end plate 31 and the plate stacked body 21 can be coupled integrally with each other.

When the riveting is completed as described above (S15), the rotational shaft 11 is inserted into the shaft holes 32 and 24 which are communicated with each other and coupled (S16), and bearing members 13 are coupled to both ends of the rotational shaft 11, whereby the manufacturing processes of the rotor are completed.

Figure 7A:
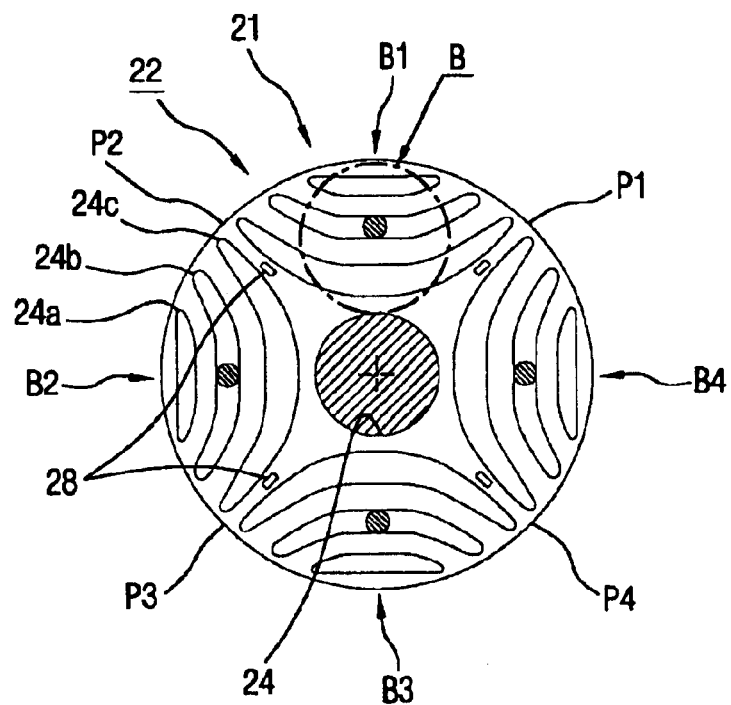
FIGS. 7A and 7B are a transverse cross-sectional view and an enlarged view showing a rotor according to a second embodiment of the present invention.
Figure 7B:
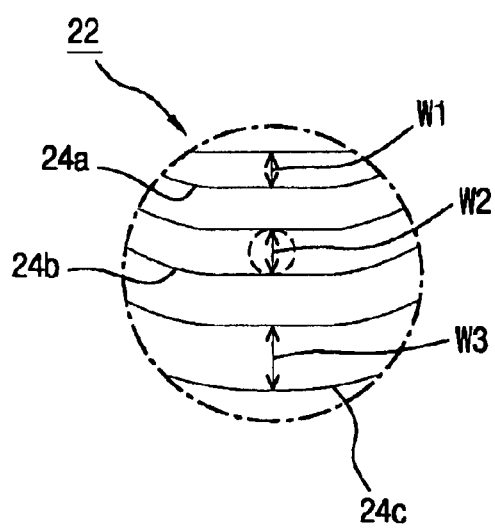

FIGS. 7A and 7B are a transverse cross-sectional view and an enlarged view showing a rotor according to the second embodiment of the present invention.

For same components as those of the first embodiment, same reference numerals are used and descriptions for those are omitted.

The second embodiment of the present invention can be applied only to the non skew type rotor, automatic stacking points 28 of square shape are formed farther than the position of the automatic stacking points 26 in the first embodiment.

That is, the automatic stacking points 28 are located between the end parts of the third flux barriers 24c which are adjacent to each other, and four automatic stacking points 28 are formed between the four flux barrier groups B1~B4.

Figure 8:
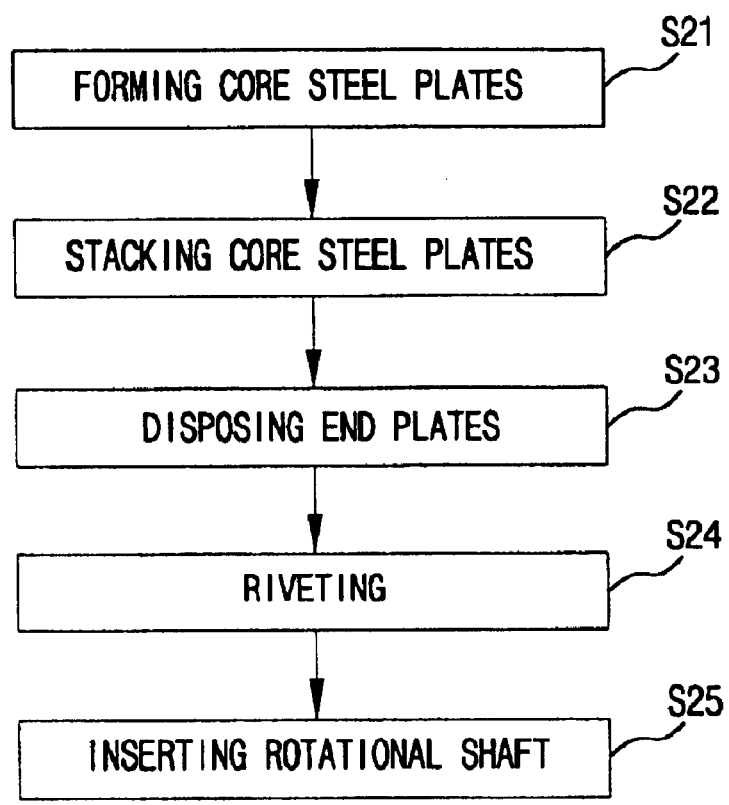
FIG. 8 is a flow chart for describing a manufacturing method of the rotor in the synchronous reluctance motor according to the second embodiment of the present invention.

FIG. 8 is a flow chart for describing a manufacturing method of the rotor for the synchronous reluctance motor according to the second embodiment of the present invention.

As shown therein, the core steel plate 22 is molded using a usual method such as pressing in order to fabricate the rotor of non skew type (S21), and then the plate stacked body 21 is made by stacking the core steel plates 22 in order so that the automatic stacking points 28 are engaged with each other (S22).

When the plate stacked body 21 is manufactured, end plates 31 are disposed on both ends of the plate stacked body 21 (S23), and riveting for the through hole 34 of the end plates 31 and the second flux barrier 24b which are communicated with each other is performed using a rivet 41 so that the end plates 31 and the plate stacked body 21 can be coupled integrally with each other. At that time, one rivet 41 is inserted into the respective flux barrier groups B1~B4, and four rivets 41 are used entirely.

On the other hand, a nonmagnetic fixing bolt may be inserted into the through hole 34 and the second flux barrier 24b without using the rivet 41, and then the end plates 31 and the plate stacked body 21 are coupled integrally with each other by coupling a nut into a male screw portion of the fixing bolt.

When the riveting is completed, the rotational shaft 11 is inserted into the shaft holes 32 and 24 to be coupled (S25), and then the bearing members 13 are coupled to both ends of the rotational shaft 11 respectively.

As described above, according to the rotor for the synchronous reluctance motor of the first and second embodiments and the manufacturing method, the number of flux barriers is reduced to three or four from the conventional flux barrier which are formed as multi-layer structure, and the automatic stacking points are formed on areas where the flux barriers are not formed. Therefore, the core steel plates are can be automatically stacked regardless of the skew type or the non skew type, and the rotor has advantages that manufacture can be made easy, producing cost can be reduced, and mass-production can be made.

Figure 9A:
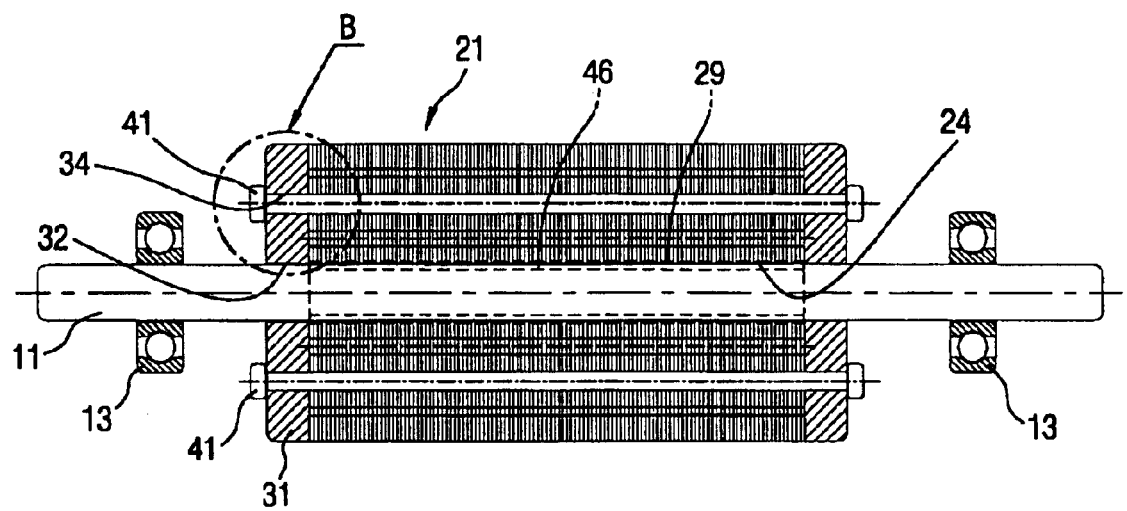
FIGS. 9A and 9B are a longitudinal cross-sectional view and an enlarged view showing a rotor of a synchronous reluctance motor according to a third embodiment of the present invention.
Figure 9B:
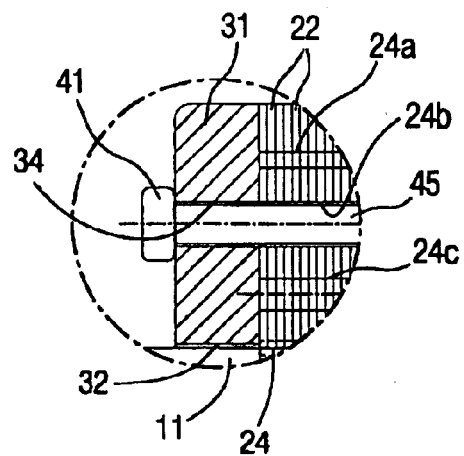
Figure 10A:
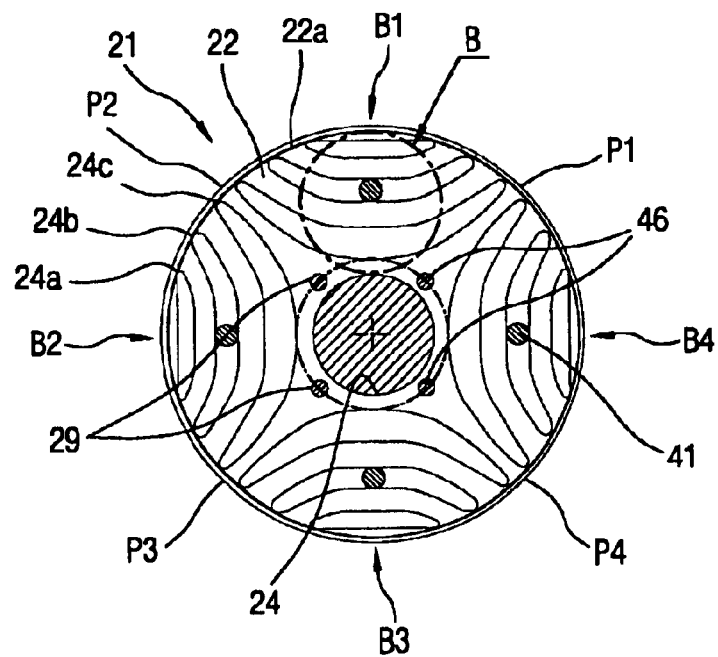
FIGS. 10A and 10B are a transverse cross-sectional view and an enlarged view showing the rotor in FIG. 9.
Figure 10B:
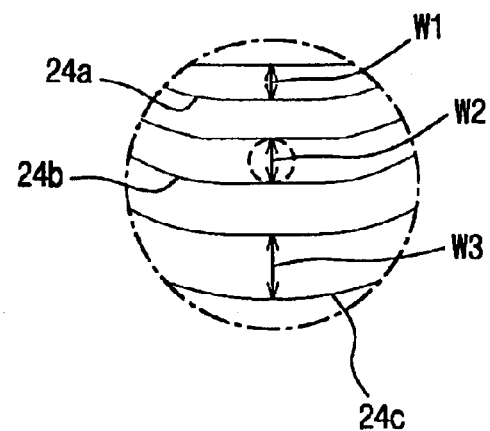

FIGS. 9A and 9B are a longitudinal cross-sectional view and an enlarged view showing a rotor for the synchronous reluctance motor according to the third embodiment of the present invention, and FIGS. 10A and 10B are a transverse cross-sectional view and an enlarged view showing the rotor in FIG. 9.

For same components as those of the first embodiment, same reference numerals are used and descriptions for those are omitted.

As shown in FIGS. 9A, 9B, 10A and 10B, the rotor for the flux barrier type synchronous reluctance motor according to the third embodiment of the present invention comprises a rotational shaft 11, a plate stacked body 21, both end plates 31, and four rivets 41.

Especially, a shaft hole 24 is formed at center part of the core steel plate 22 so that the rotational shaft 11 is inserted therein, and a plurality of pin holes 29 are formed on boundary part of the shaft hole 24. A non magnetic pin 46 is inserted into the respective pin hole 29 so as to prevent the stacked core steel plates 22 from rotating/moving along with plate surface direction.

Also, a rib 22a which is adjacent to end parts of the respective flux barriers 24a~24c is formed on the boundary part of the core steel plate 22.

In case that the respective flux barriers 24a~24c are disposed to have a predetermined skew for the rotational shaft 11, a straight line part is formed at the center part of the second flux barrier 24b in the respective flux barrier groups B1~B4 so as to receive the rivet 41 or a bolt (not shown).

Figure 11:
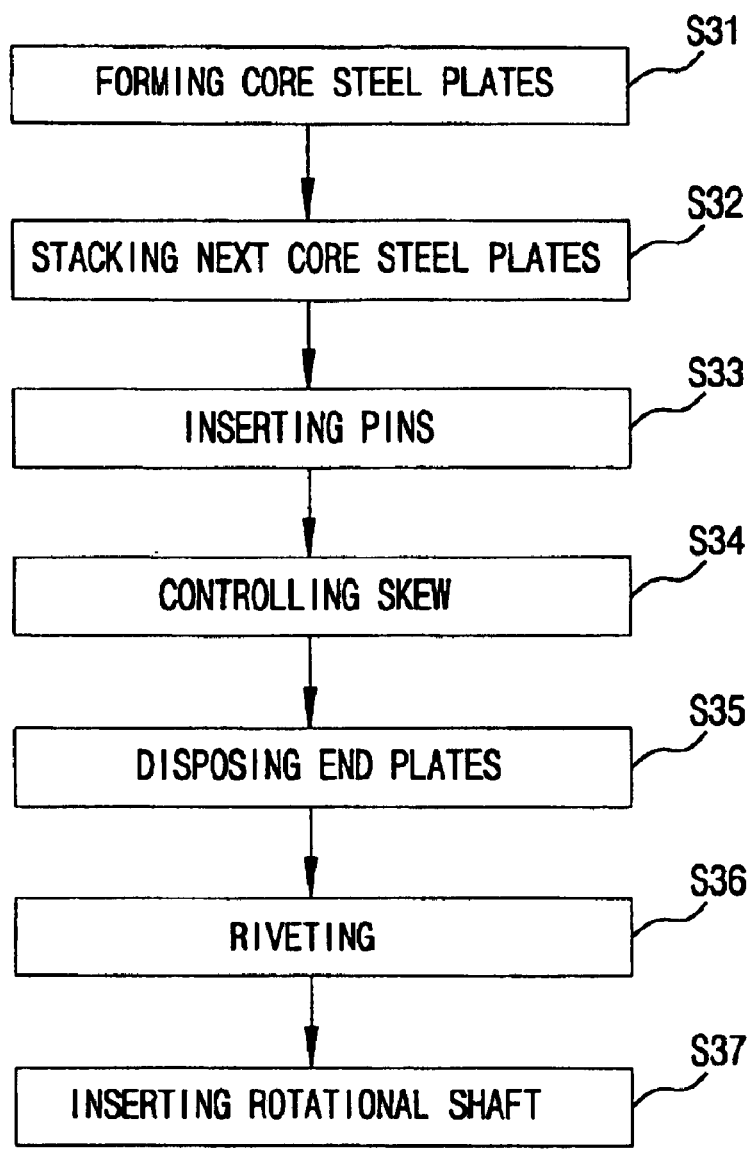
FIG. 11 is a flow chart for describing a manufacturing method of the rotor in the synchronous reluctance motor according to the third embodiment of the present invention.

FIG. 11 is a flow chart for describing a manufacturing method of the rotor for the synchronous reluctance motor according to the third embodiment of the present invention.

To begin with, when the core steel plate 22 is formed by pressing (S31), the plate stacked body 21 is formed by stacking a predetermined numbers of the core steel plates in order so that the shaft holes 24 and the pin holes 29 formed at the center part of the respective core steel plates 22 are communicated with each other (S32). After that, pins 46 are inserted into the pin holes 29 which are communicated with each other on the plate stacked body 21 so as to prevent the respective core steel plates 22 from moving along with the plate surface direction (S33). Herein, in case that the flux barriers 24a~24c are disposed to have a predetermined skew for the rotational shaft 11, the skew is controlled by twisting both end parts of the plate stacked body 21 (S34).

After that, the end plates 24 are disposed on both ends of the plate stacked body 21 (S35), and riveting for the respective through holes 43 of the end plates 24 is performed so that the end plates 24 and the plate stacked body 21 can be coupled integrally with each other (S36).

Herein, nonmagnetic fixing bolts (not shown) on which male screw portions are formed on one sides are inserted into the respective through holes 43, and non magnetic nut (not shown) may be coupled to the male screw portions.

When the riveting is completed (S36), the rotational shaft 11 is inserted into the shaft holes 24 and 42 which are communicated with each other to couple them (S37), and the bearing members 13 are coupled to both ends of the rotational shaft 11, then the manufacturing process of the rotor is completed.

In the above embodiment, four magnetic pole portions and four flux barrier groups are formed on boundary part of the core steel plate alternatively with each other, however, the number of the flux barriers and the magnetic poles can be controlled according to the characteristic of the motor.

Also, in the above embodiment, the respective flux barrier groups include the first, second, and third flux barriers along with the radial direction, however, the number of the barriers can be varied in consideration of the characteristic of the rotor and the size of the core steel plate.

In addition, in the above embodiment, the riveting is made as penetrating inside the respective second flux barriers, however, the rivet or the bolt may be coupled as penetrating other flux barriers.

As described above, according to the present invention, the end plates on both ends are coupled using four non magnetic bolts or rivets without inserting a plurality of lugs into the rotator core in the conventional art, and therefore the manufacturing cost can be reduced. In addition, the core steel plates can be stacked automatically by ensuring a space for riveting, and therefore the rotor can be manufactured easily, the manufacturing cost can be reduced, and the rotor can be mass-produced.

Also, according to the present invention, edge parts are not separated from each other after the core steel plates are stacked and distortion on the core steel plate can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of manufacturing a rotor for a synchronous reluctance motor, comprising:

forming a plurality of disc shaped core plates, wherein a shaft hole is formed in a center of each core plate, and wherein a plurality of magnetic flux barrier groups is formed around the shaft hole, each magnetic flux barrier group comprising a plurality of elongated non-circular apertures located between the shaft hole and a periphery of the core plate;

stacking the plurality of core plates such that corresponding ones of the plurality of elongated non-circular apertures in each magnetic flux barrier group on each of the core plates are aligned with one another; and inserting a plurality of fasteners through selected ones of the elongated non-circular apertures of the magnetic flux barrier groups to hold the stacked core plates together to form the rotor.

2. The method of claim 1, wherein the forming step comprises forming each of the plurality of core plates such that a plurality of aligning pin holes are formed around a periphery of the shaft hole in each core plate, and further comprising inserting an aligning pin through each aligning pin hole after the stacking step has been performed.

3. The method of claim 2, wherein the forming step further comprises forming each of the plurality of core plates such that a rib is formed along the periphery of each core plate, wherein the rib is configured to help ensure that the core plates remain properly aligned after the stacking step has been performed.

4. The method of claim 3, wherein the forming step is performed such that each of the plurality of elongated non-circular apertures in each magnetic flux barrier group has a different width.

5. The method of claim 4, wherein the forming step is performed such that a width of the elongated non-circular aperture of each magnetic flux barrier group that is closest to the shaft hole has the greatest width.

6. The method of claim 1, wherein the forming step further comprises forming each of the plurality of core plates such that a rib is formed along the periphery of each core plate, wherein the rib is configured to help ensure that the core plates remain properly aligned after the stacking step has been performed.

7. The method of claim 1, wherein the forming step is performed such that each of the plurality of elongated non-circular apertures in each magnetic flux barrier group has a different width.

8. The method of claim 7, wherein the forming step is performed such that a width of the elongated non-circular aperture of each magnetic flux barrier group that is closest to the shaft hole has the greatest width.

9. The method of claim 7, wherein the forming step is performed such that a width of each elongated non-circular aperture of a flux barrier group varies from an adjacent elongated non-circular aperture in a prescribed manner.

10. The method of claim 9, wherein the forming step is performed such that a width of an elongated non-circular aperture proximate the shaft hole is greater than an adjacent elongated non-circular aperture of the respective flux barrier group, and a width of an elongated non-circular aperture proximate the periphery of the core plate is less than an adjacent elongated non-circular aperture of the respective flux barrier group.

11. The method of claim 1, wherein the forming step further comprises forming a length of each elongated non-circular aperture greater than a width of each elongated non-circular aperture.

12. The method of claim 1, wherein the forming step is performed such that each elongated non-circular aperture comprises a tapered end.

13. The method of claim 12, wherein the forming step is performed such that a side of an elongated non-circular aperture proximate the periphery of the core plate is substantially straight.

14. A method of manufacturing a rotor for a synchronous reluctance motor, comprising:

forming a plurality of disc shaped core plates, wherein a shaft hole is formed in a center of each core plate, wherein a plurality of magnetic flux barrier groups is formed around the shaft hole, wherein each magnetic flux barrier group comprises a plurality of elongated apertures wherein an outer elongated aperture disposed proximate to a periphery of the core plate and an inner elongated aperture disposed proximate to a center of the core plate define a flux barrier group therebetween, wherein a width of each elongated aperture within a flux barrier group increases in accordance to a distance from the respective elongate aperture to a center of the core plate and wherein a rib is formed along the periphery of each core plate, wherein the rib is configured to help ensure that the core plates remain properly aligned;

stacking the plurality of core plates such that corresponding ones of the plurality of elongated apertures in each magnetic flux barrier group on each of the core plates are aligned with one another; and fastening the stacked plurality of core plates together to form the rotor.

15. The method of claim 14, wherein the forming step comprises forming each of the plurality of core plates such that a plurality of aligning pin holes is formed around a periphery of the shaft hole in each core plate, and further comprising inserting an aligning pin through each aligning pin hole after the stacking step has been performed.

16. The method of claim 14, wherein the fastening step comprises inserting an elongated fastener through at least one elongated aperture in each of the magnetic flux barrier groups.

17. The method of claim 16, wherein the forming step comprises forming each of the plurality of core plates such that a plurality of aligning pin holes is formed around a periphery of the shaft hole in each core plate, and further comprising inserting an aligning pin through each aligning pin hole after the stacking step has been performed.

18. The method of claim 16, wherein the forming step further comprises forming each of the plurality of core plates such that a rib is formed along the periphery of each core plate, wherein the rib is configured to help ensure that the core plates remain properly aligned after the stacking step has been performed.

19. The method of claim 16, wherein inserting an elongated fastener comprises inserting a rivet.

20. The method of claim 14, wherein the forming step is performed such that a width of each elongated aperture of each magnetic flux barrier group that is closest to the shaft hole has the greatest width.

21. The method of claim 15, wherein the forming step is performed such that a central section of at least one elongated aperture in each magnetic flux barrier group is substantially straight.

22. The method of claim 21, wherein the fastening step comprises inserting an elongated fastener through straight section of the at least one elongated aperture in each of the magnetic flux barrier groups.

23. The method of claim 14, wherein the forming step comprises forming each of the core plates such that a plurality of stacking points is formed on each core plate, and wherein the stacking points are configured to help align the core plates during performance of the stacking step.

24. The method of claim 23, wherein the forming step comprises forming the plurality of stacking points on each core plate around a periphery of the shaft hole.

25. The method of claim 23, wherein the forming step comprises forming the plurality of stacking points on each core plate between each of the plurality of magnetic flux barrier groups.

26. The method of claim 14, wherein the forming step further comprises forming a length of each elongated aperture greater than a width of each elongated aperture.

27. The method of claim 14, wherein the forming step is performed such that each elongated aperture comprises a tapered end.

28. The method of claim 14, wherein the forming step is performed such that a width of each elongated non-circular aperture of a magnetic flux barrier group varies in a prescribed relationship, and the prescribed relationship decreases a corresponding width as the elongated non-circular aperture is further from the shaft hole.

29. A method of manufacturing a rotor for a synchronous reluctance motor, comprising:

forming a plurality of disc shaped core plates, wherein a shaft hole is formed in a center of each core plate, and wherein a plurality of magnetic flux barrier groups is formed around the shaft hole, each magnetic flux barrier group comprising at least three elongated apertures located between the shaft hole and the periphery of the core plate;

stacking the plurality of core plates such that corresponding ones of the plurality of elongated apertures in each magnetic flux barrier group on each of the core plates are aligned with one another; and inserting a fastener through an elongated aperture of a magnetic flux barrier group, wherein a first and second elongated aperture of the flux barrier group is adjacent the fastener on a first side and a second side of the fastener.

30. The method of claim 29, wherein the forming step further comprises forming a length of each elongated aperture greater than a width of each elongated aperture.

31. The method of claim 29, wherein the forming step is performed such that each elongated aperture comprises a tapered end.

32. The method of claim 29, wherein the forming step is performed such that a side of an elongated aperture proximate the periphery of the core plate is substantially straight.

* * * * *